(12) United States Patent
Larson-Smith et al.

(10) Patent No.: US 12,661,880 B2
(45) Date of Patent: Jun. 23, 2026

(54) METHODS FOR MANUFACTURING RESIN-INFUSED PARTS HAVING INTEGRAL PROTECTIVE COATINGS

(71) Applicant: The Boeing Company, Arlington, VA (US)

(72) Inventors: Kjersta Larson-Smith, Seattle, WA (US); Terrell D. Riley, Summerville, SC (US); Christopher Garnier, North Charleston, SC (US); Alexandra E. Corona, Summerville, SC (US); Jessica O. Fry, Charleston, SC (US); Kevin D. Gordon, Summerville, SC (US); Mark R. Brei, Ladson, SC (US)

(73) Assignee: The Boeing Company, Arlington, VA (US)

( * ) Notice: Subject to any disclaimer, the term of this patent is extended or adjusted under 35 U.S.C. 154(b) by 616 days.

(21) Appl. No.: 18/160,057

(22) Filed: Jan. 26, 2023

(65) Prior Publication Data

US 2024/0253339 A1 Aug. 1, 2024

(51) Int. Cl.
| | |
|---|---|
| *B32B 27/12* | (2006.01) |
| *B32B 7/10* | (2006.01) |
| *B32B 27/08* | (2006.01) |
| *B32B 27/18* | (2006.01) |
| *B32B 27/38* | (2006.01) |
| *B32B 27/40* | (2006.01) |

(Continued)

(52) U.S. Cl.
CPC ............... *B32B 27/40* (2013.01); *B32B 7/10* (2013.01); *B32B 27/08* (2013.01); *B32B 27/12* (2013.01); *B32B 27/18* (2013.01); *B32B 27/38* (2013.01); *B32B 37/1018* (2013.01); *B32B 38/08* (2013.01); *B32B 2038/0076* (2013.01); *B32B 2260/021* (2013.01); *B32B 2260/046* (2013.01); *B32B 2307/71* (2013.01); *B32B 2363/00* (2013.01); *B32B 2375/00* (2013.01)

(58) Field of Classification Search
None
See application file for complete search history.

(56) References Cited

U.S. PATENT DOCUMENTS

| | | | | |
|---|---|---|---|---|
| 2004/0155385 A1* | 8/2004 | Johnson | ............... | B29C 70/443 |
| | | | | 264/572 |
| 2007/0108665 A1* | 5/2007 | Glain | ...................... | B29C 70/44 |
| | | | | 264/405 |

(Continued)

FOREIGN PATENT DOCUMENTS

| | | |
|---|---|---|
| PT | 2422077 E | 11/2013 |
| WO | WO2023152679 A1 | 8/2023 |

OTHER PUBLICATIONS

Machine-generated English language translation of Portugal Patent Application Publication No. PT10713644, Nov. 25, 2013.

(Continued)

*Primary Examiner* — Mohammad M Ameen
(74) *Attorney, Agent, or Firm* — Kolitch Romano Dascenzo Gates LLP

(57) ABSTRACT

A method of manufacturing a resin-infused part, may include: preparing a laminate by layering a curable protective film onto a fibrous preform; infusing resin into the laminate under a vacuum, such that the resin impregnates the fibrous preform and the protective film adheres to the fibrous preform; and curing the laminate at a curing temperature.

20 Claims, 9 Drawing Sheets

(51) Int. Cl.
    *B32B 37/10*      (2006.01)
    *B32B 38/08*      (2006.01)
    *B32B 38/00*      (2006.01)

(56)      References Cited

U.S. PATENT DOCUMENTS

| | | |
|---|---|---|
| 2008/0182054 A1 | 7/2008 | Ridges et al. |
| 2010/0166998 A1 | 7/2010 | Bannister et al. |
| 2012/0204741 A1* | 8/2012 | Bremmer .............. B29C 70/549 |
| | | 156/60 |
| 2016/0031164 A1* | 2/2016 | Downs .................. B29C 66/721 |
| | | 428/12 |
| 2019/0111637 A1 | 4/2019 | Hanna et al. |
| 2021/0016319 A1 | 1/2021 | Brei et al. |
| 2021/0016553 A1 | 1/2021 | Brei et al. |
| 2021/0023798 A1* | 1/2021 | Stawski .................. B29C 70/06 |

OTHER PUBLICATIONS

Machine-generated English language translation of WIPO Patent Application Publication No. WO2023152679A1, Aug. 17, 2023.
European Patent Office, Extended European Search Report in related European Patent Application No. EP 23 21 4770, May 14, 2024.

\* cited by examiner

900

902 APPLY FIRST CURABLE FILM TO CAUL PLATE

904 APPLY SECOND CURABLE FILM TO FIRST CURABLE FILM

906 INSTALL CAUL PLATE OVER PREFORM

908 INFUSE RESIN UNDER VACUUM

910 CURE PREFORM AND CURABLE FILM

912 POST-CURE RESIN INFUSION PART

1000

1002 APPLY FIRST CURABLE FILM TO FIBROUS PREFORM

1004 APPLY SECOND CURABLE FILM TO FIRST CURABLE FILM

1006 INSTALL CAUL PLATE OVER PREFORM

1008 INFUSE RESIN UNDER VACUUM

1010 CURE PREFORM AND CURABLE FILM

1012 POST-CURE RESIN INFUSION PART

METHODS FOR MANUFACTURING RESIN-INFUSED PARTS HAVING INTEGRAL PROTECTIVE COATINGS

FIELD

This disclosure relates to systems and methods for manufacturing resin-infused parts.

INTRODUCTION

Fiber-reinforced resin composites (i.e., for aircraft, spacecraft, watercraft, automobiles, and/or the like) generally comprise fibers impregnated with a resin matrix. In some examples, resin composites are fabricated from fibers pre-impregnated with resin (AKA prepregs). However, composite parts manufactured from prepregs may have lower fiber content and greater variation in density than may be desired for high-precision applications.

Resin-infusion processes produce composite parts (AKA resin-infused parts) having higher fiber content and consistent density by infusing resin, such as epoxy resin, into dry fibers under a vacuum. Typical resins used for resin infusion processes degrade upon prolonged exposure to ultraviolet-visible (UV-vis) light. Accordingly, protective coatings must generally be applied to resin-infused parts after fabrication to protect the parts from environmental damage, such as damage due to fluid exposure, UV-vis exposure, impact, and/or the like. Protective coatings typically used in the art include surfacing films, primers, paint replacements, paints, and/or the like. Conventional protective coatings are typically applied using methods that generate volatile organic compounds (VOCs), use consumable materials, and have poor ergonomics for workers. Typically, these protective coatings must be applied using a paint booth, which is both costly to maintain and requires substantial floor space. Conventional protective coatings further require preparation of the underlying composite surface, such as sanding, which generates VOCs, uses consumables, and has poor ergonomics for workers. In some examples, a sanding booth is further required in addition to and/or in combination with the paint booth. Additionally, application and curing of conventional protective coatings adds time to manufacturing of resin-infused parts.

SUMMARY

The present disclosure provides systems, apparatuses, and methods relating to manufacturing resin-infused parts having integral protective coatings. Systems and methods of the present disclosure are configured to overcome concerns that the integral protective coatings would impede resin flow through the dry fibers during resin infusion. If resin flow is impeded during manufacture, resultant resin-infused parts may have dry spots and uneven resin content, resulting in diminished structural properties.

In some examples, a method of manufacturing a resin-infused part includes: preparing a laminate by layering a curable protective film onto a fibrous preform; infusing resin into the laminate under a vacuum, such that the resin impregnates the fibrous preform and the curable protective film adheres to the fibrous preform; and curing the laminate at a curing temperature.

In some examples, a method of manufacturing a resin-infused part includes: applying a first curable film to a caul plate; installing the caul pate over a fibrous preform; infusing resin into the fibrous preform under vacuum, such that the fibrous preform is impregnated by the resin and the first curable film adheres to the fibrous preform; and curing the fibrous preform and the first curable film.

In some examples, a method of manufacturing a resin-infused part includes: applying a first curable film to a fibrous preform; installing a caul plate over the curable film; infusing resin into the fibrous preform under vacuum, such that the resin permeates the fibrous preform and the curable film adheres to fibrous preform; and curing the fibrous preform and the curable film.

In some examples, a vacuum assembly prepared for resin infusion includes: a fibrous preform; a curable protective film layered over the fibrous preform; and a caul plate installed over the curable protective film.

Features, functions, and advantages may be achieved independently in various embodiments of the present disclosure, or may be combined in yet other embodiments, further details of which are discussed with reference to the following description and drawings.

DETAILED DESCRIPTION

Figure 1:
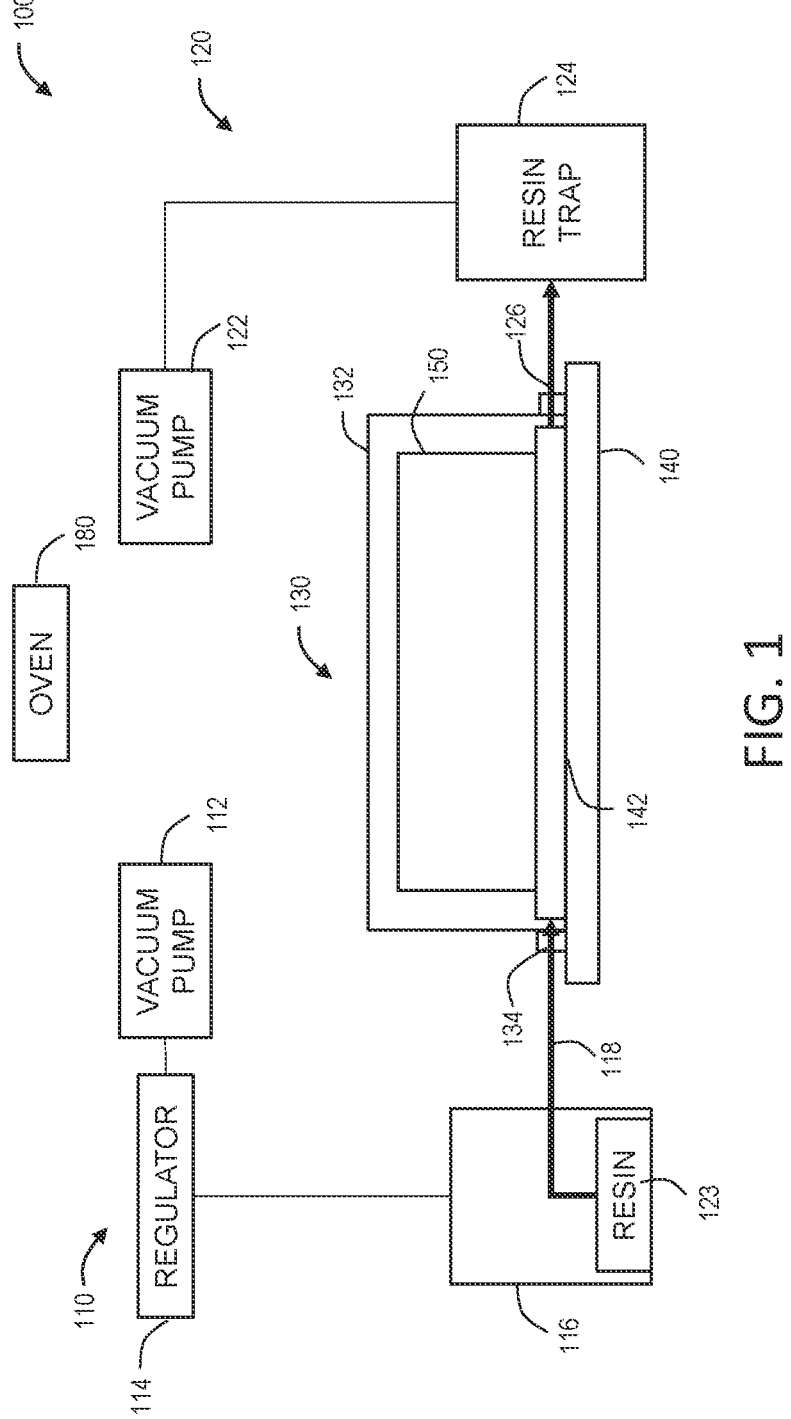
FIG. 1 is a schematic diagram of a first illustrative resin infusion system in accordance with the present teachings.

Various aspects and examples of resin-infused parts having integral protective films, as well as related methods, are described below and illustrated in the associated drawings. Unless otherwise specified, resin-infused parts having integral protective films of the present teachings, and/or their various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses.

Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

"Co-curable" materials are materials which can be simultaneously cured at similar temperatures. "Co-curing" refers to curing two materials within a single vacuum apparatus or in a single curing step.

"Released" components are components configured to resist adhesive bonding. Accordingly, a "released" component may be covered with a non-stick coating configured to resist adhesive, also referred to as a "release layer". Release coatings may comprise any suitable films configured to resist adhesive bonding, such as silicone, polytetrafluoroethylene (PTFE), polyvinyl acrylate (PVA), and/or the like.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a method of manufacturing a resin-infused part having an integral protective coating includes preparing a laminate by layering a curable protective film onto a fibrous preform; infusing resin into the fibrous preform under a vacuum, such that the resin impregnates the fibrous preform and the curable protective film adheres to the fibrous preform; and curing the laminate at a curing temperature. The curable protective film is applied to the fibrous preform before resin infusion. During resin infusion, the curable protective film adheres to the fibrous preform and the fibrous preform is impregnated by the resin, resulting in a resin-infused part having an integral protective film.

The curable protective film is co-curable with the resin-infused part. Accordingly, curing the laminate cures both the curable protective film and the resin-infused part. Manufacturing a resin-infused part in accordance with the present teachings adheres an integral protective coating to the resin-infused part, protecting the part from environmental damage without additional manufacturing steps. Resin-infused parts of the present disclosure are suitable for use in a variety of industrial applications, such as aircraft, spacecraft, watercraft, wind turbines, machinery, and/or the like.

Curable protective films of the present teachings may comprise one or more of a variety of materials configured to provide desired properties in the completed resin-infused part. In some examples, the curable protective film comprises epoxide resins, such that curing the film forms an epoxy surfacing layer. In some examples, the curable protective film includes UV-blocking additives (i.e., ultraviolet-light blocking additives), such that the film is configured to protect the resin-infused part from UV-vis damage (i.e., damage caused by exposure to ultraviolet-visible light). In some examples, the curable protective film comprises polyurethane prepolymers, such that curing the film forms a polyurethane paint replacement layer. In these examples, paint may be applied directly to the curable protective film, reducing or eliminating the need for further sanding and/or priming steps. In some examples, the curable protective film comprises two or more layers, such as a prepolymer layer, a tack layer (AKA adhesive layer), a scrim layer (AKA reinforcement layer), and/or the like. In some examples, two or more curable protective films having different properties are applied to the fibrous preform.

Examples, Components, and Alternatives

The following sections describe selected aspects of illustrative resin-infused parts having integral protective coatings as well as related systems and/or methods. The examples in these sections are intended for illustration and should not be interpreted as limiting the scope of the present disclosure. Each section may include one or more distinct embodiments or examples, and/or contextual or related information, function, and/or structure. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

A. First Illustrative Manufacturing System

Figure 2:
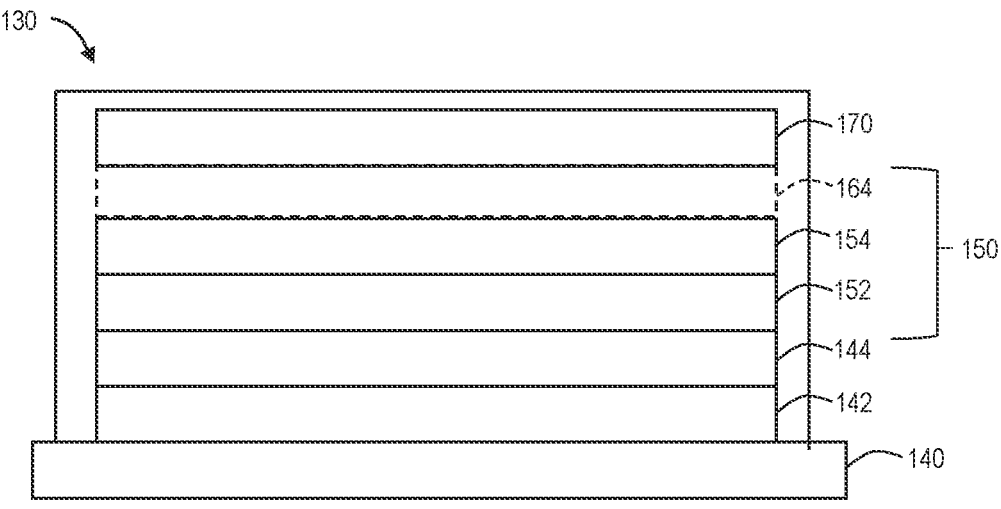
FIG. 2 is a schematic diagram of an illustrative vacuum apparatus suitable for inclusion in the resin infusion system of FIG. 1.
Figure 3:
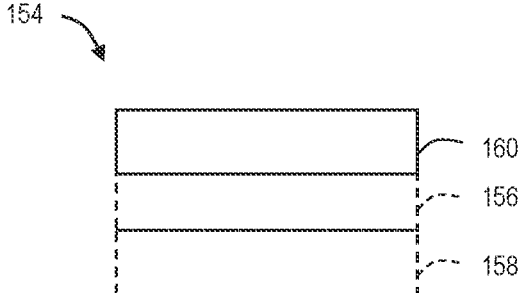
FIG. 3 is a schematic diagram of an illustrative curable protective film suitable for inclusion in the illustrative vacuum apparatus of FIG. 2.

As schematically illustrated in FIGS. 1-3, this section describes an illustrative resin infusion system 100. Resin infusion system 100 is a system suitable for manufacturing the resin-infused parts having integral protective coatings described above.

Resin infusion system 100 includes a resin inlet system 110 and a resin outlet system 120, the resin inlet system and resin outlet system operatively coupled to a vacuum apparatus 130, such that resin is passed through the vacuum apparatus from inlet to outlet when the resin infusion system is in use. Vacuum apparatus 130 includes a sealed container configured to maintain a vacuum, such as a vacuum bag, airtight tool, airtight mold, and/or the like. Vacuum apparatus 130 maintains an atmosphere under vacuum, and contains a laminate 150 through which resin is infused by resin inlet system 110 and resin outlet system 120. Accordingly, resin infusion system 100 infuses or impregnates laminate 150 with resin by passing resin through vacuum apparatus 130 under a vacuum. In the present example, laminate 150 includes at least a fibrous preform 152 and a curable protective film 154 applied to the fibrous preform.

With reference to FIG. 1, resin infusion system 100 includes resin inlet system 110 and resin outlet system 120, each of which is operatively coupled to vacuum apparatus 130. Resin inlet system 110 and resin outlet system 120 are configured to collectively apply a vacuum to vacuum apparatus 130, such that gas (e.g., air) within the vacuum apparatus is removed and resin is caused to flow through the vacuum apparatus.

Resin inlet system 110 includes an inlet-side vacuum pump 112 and a regulator 114 coupled to a resin reservoir 116. A resin inlet line 118 couples resin reservoir 116 to vacuum apparatus 130. Regulator 114 varies a vacuum force applied by vacuum pump 112, such that an inlet pressure of resin inlet system 110 may be controlled by adjusting the regulator. In some examples, an inlet pressure of resin inlet system 110 is approximately equal to atmospheric pressure (1 atm). In some examples, such as in a controlled atmospheric pressure resin infusion process (CAPRI), an inlet pressure of resin inlet system 110 is lower than atmospheric pressure. In some examples, an inlet pressure of resin inlet system is approximately 0.5 atm.

Resin outlet system 120 includes an outlet-side vacuum pump 122 and a resin trap 124. A resin outlet line 126 couples vacuum apparatus 130 to resin trap 124. Inlet-side vacuum pump 112 and outlet-side vacuum pump 122 collectively apply a pressure differential to the resin infusion system, causing resin 123 to flow through the system between resin reservoir 116 and resin trap 124. In some examples, a negative pressure differential is applied, wherein an inlet pressure of resin inlet system 110 is higher than an outlet pressure of resin outlet system 120. In some examples, a positive pressure differential is applied, wherein an outlet pressure of resin outlet system 120 is higher than an inlet pressure of resin inlet system 110. Resin trap 124 is configured to trap excess resin extracted from the vacuum apparatus by vacuum pump 122. Accordingly, resin trap 124 may include any suitable receptacle, such as a canister, container, bucket, and/or the like. In some examples, vacuum apparatus 130 includes an internal break zone configured to prevent resin 123 from leaving the vacuum apparatus.

FIG. 2 depicts vacuum apparatus 130 and layered components of the vacuum apparatus. Vacuum apparatus 130 may include any suitable sealable container configured to maintain a vacuum or pressure differential while containing layered components of a resin-infused part of the present teachings. Layered components contained within vacuum apparatus 130 may additionally or alternatively be referred to as a "stack up," "lay up," and/or the like. In the example depicted in FIGS. 1 and 2, vacuum apparatus 130 comprises a vacuum bag 132 taped at edges to a released tool 140 by tape 134. Taping the vacuum bag to the released tool may seal the vacuum bag, such that the vacuum bag maintains a vacuum when resin infusion system 100 is in use. Released tool 140 provides an underlying surface onto which components within vacuum apparatus 130 are layered. However, in some examples, such as in the example depicted in FIGS. 4 and 5, vacuum apparatus 130 comprises a released plate coupled in a sealable manner to released tool 140, such that the released plate and released tool collectively form a sealed compartment configured to maintain a vacuum when resin infusion system 100 is in use.

Layered onto released tool 140 are a series of layers or layered components through which resin is infused during a resin infusion process. As described above, this series of layers may be referred to as a "stack up." Released tool 140 is coated or otherwise covered with a release coating configured to prevent resin from adhering to the tool. Components described herein as "released" are similarly coated, in that released components are covered with a non-stick (release) coating configured to resist adhesive. Release coatings may include any suitable films configured to resist adhesive bonding, such as silicone, polytetrafluoroethylene (PTFE), polyvinyl acrylate (PVA), and/or the like.

Flow media 142 is disposed on top of released tool 140. Flow media 142 carries resin from resin inlet line 118 to resin outlet line 126. Generally, flow media 142 is configured to space fibrous preform 152 apart from released tool 140, facilitating the flow of resin under the fibrous preform. Resin flows through the flow media under the fibrous preform, infusing into the fibrous preform from beneath, resulting in even infiltration. In some examples, flow media 142 comprises a polymer mesh.

A porous release film 144 is disposed on top of flow media 142. Porous release film 144 is evenly perforated, filtering the resin and providing an even flow of resin into the fibrous preform. In some examples, porous release film 144 is coated with a release coating and/or comprises or consists essentially of a material configured to resist bonding with resin, such as silicone, polytetrafluoroethylene (PTFE), polyvinyl acrylate (PVA), and/or the like. In some examples, porous release film 144 is configured to provide a smooth bottom surface for the resin-infused part by providing a barrier between the fibrous preform and the flow media mesh.

Laminate 150 is disposed on top of the porous release film. Laminate 150 includes fibrous preform 152 and at least one curable protective film 154. Fibrous preform 152 is disposed on top of porous release film 144. Fibrous preform 152 comprises a plurality of dry fibers configured to be adhered together by a resin matrix after resin infusion. The dry fibers are free from resin before resin infusion. The fibrous preform generally defines the shape of the completed resin-infused part. Fibrous preform 152 may include dry fibers arranged in any suitable shape for reinforcing a resin-infused part. Fibers may be aligned along one or more axes of the part (e.g., x-, y-, and z-axes), thereby modifying structural characteristics of the finished material. In some examples, the dry fibers are manufactured together in sheets, mats, cloths, and/or the like using any suitable manufacturing technique such as weaving, knitting, braiding, stitching, etc. In some examples, the fibrous preform comprises one or more laminated sheets of fibrous material. In some examples, the fibrous preform comprises any suitable fibrous reinforcement material, such as carbon fiber, basalt, fiberglass, aramid fibers (e.g., Kevlar), and/or the like.

Curable protective film 154 is disposed on top of fibrous preform 152. Curable protective film 154 is configured to protect the resin-infused part after infusion (e.g., from environmental damage). In some examples, curable protective film 154 is configured to be a curable surfacing film. In some examples, curable protective film 154 is configured to be a curable paint replacement film. In some examples, curable protective film 154 may be draped over fibrous preform 152. Before curable protective film 154 is cured, the film comprises a prepolymer film. Co-curing curable protective film 154 with the resin-infused part causes curable protective film 154 to crosslink and become rigid.

FIG. 3 is a schematic cross-section of a curable protective film 154 suitable for use in resin infusion system 100. In some examples, curable protective film 154 is configured to act as a resin barrier, protecting the resin matrix from environmental degradation. In some examples, curable protective film is configured to withstand forces or stresses applied to the protective film. Accordingly, in some examples, curable protective film 154 includes a reinforcement layer or scrim 156. Furthermore, curable protective film 154 is configured to adhere to the resin matrix. Accordingly, in some examples, curable protective film 154 includes a tack or adhesive layer 158. In the example depicted in FIG. 3, curable protective film 154 includes a prepolymer layer 160 applied to a first side of scrim 156 and a tack layer 158 applied to a second side of scrim 156.

While the example depicted in FIG. 3 includes one example of a curable protective film suitable for use in resin infusion system 100, a variety of curable protective films may be envisaged. For example, a suitable curable protective film may include a prepolymer layer. In some examples, a suitable curable protective film includes a prepolymer layer and a tack layer. In these examples, the prepolymer layer may be substantially self-supporting, and the curable protective film does not include a scrim. In some examples, such as when a film application process is automated, a suitable curable protective film includes a prepolymer layer and a scrim.

Prepolymer layer 160 may include any suitable prepolymer film configured to form a protective film upon curing. In some examples, curable film 154 comprises thermosetting resins and is a curable surfacing film. Accordingly, prepolymer layer 160 may comprise epoxide resins (e.g., aliphatic epoxides, aromatic epoxides, etc.), and curing the fibrous preform and the curable protective film forms an epoxy surfacing layer. In these examples, curable film 154 may include an ultraviolet-visible light (UV-vis)-blocking additive, such as butylated hydroxytoluene (BHT), 2-hydroxy-4-methoxy-benzophenone (UV-9), 2,4-Bis(2,4-dimethylphenyl)-6-(2-hydroxy-4-octyloxyphenyl)-1,3,5-triazine, 3,5-Di-tert-butyl-4-hydroxybenzoic acid, n hexadecyl ester, titanium dioxide, carbon black, and/or the like. In some examples, curable film 154 comprises polyurethane prepolymers, such as isocyanates, polyols, and/or the like, and curing the fibrous preform and the curable protective film forms a polyurethane paint replacement layer. In some examples, curable protective film 154 comprises at least one isocyanate and at least one polyol. In these examples, curable protective film 154 may further comprise strengthening agents configured to increase a cure temperature of the polyurethane prepolymers.

Scrim 156 may include any suitable reinforcement material or structure for the curable protective film. Scrim 156 prevents shape changes within the film, ensures that the film is not stretched during application (undesirably decreasing a thickness of the film), and maintains the thickness of the film during manufacturing and storage. In other words, scrim 156 improves a handleability of the curable protective film. In some examples, scrim 156 comprises a thermoplastic film, such that the scrim layer blocks resin from penetrating the thermosetting layer. In some examples, scrim 156 comprises a woven fabric, such that structural properties of the scrim mimic properties of the underlying fibrous preform. Tack layer 158 may include any suitable adhesive configured to adhere the curable protective film to the resin and/or the fibrous preform, such as pressure-sensitive adhesive materials (e.g., epoxies, acrylics, polyurethane, etc.) and/or the like. In some examples, tack layer 158 is configured to adhere the curable protective film to a caul plate applied over the curable protective film. In some examples, curable protective film 154 includes a tack layer applied to both sides of the curable protective film.

In some examples, laminate 150 further comprises an additional curable protective film 164 layered onto curable protective film 154. In these examples, first curable protective film 154 comprises epoxide resins and second curable protective film 164 comprises polyurethane prepolymers. Accordingly, first curable protective film 154 comprises a surfacing film and second curable protective film 164 comprises a paint replacement film.

A caul plate 170 is installed over curable protective film 154. Caul plate 170 is configured to apply pressure to laminate 150 during resin infusion. In some examples the caul plate further comprises a release layer. In some examples, caul plate 170 forms the top half of a sealed vacuum mold.

Resin infusion system 100 further comprises an oven 180 configured to heat vacuum assembly 130, thereby curing curable protective film 154, optional second curable protective film 164, and fibrous preform 152 after resin infusion. A curing temperature of oven 180 is selected based on the components of laminate 150. In some examples, a curing temperature of oven 180 is from 345° F. to 365° F. (174 to 185° C.). In some examples, curing the laminate includes a single curing step. Accordingly, in some examples, the curing temperature is 180° C. (356° F.), with a heating rate from 1 to 5° F./minute. In other words, the curing temperature gradually increases throughout the curing time. In some examples, curing the laminate is a two-step process, including a cure and a post-cure. In these examples, a curing temperature of oven 180 is from 212° F. to 320° F. (100 to 160° C.). Oven 180 may be further configured to post-cure laminate 150 at a curing temperature of 345 to 365° F. (174 to 185° C.). The oven may maintain the laminate at the post-curing temperature for approximately 60 to 120 minutes.

B. Second Illustrative Manufacturing System

Figure 4:
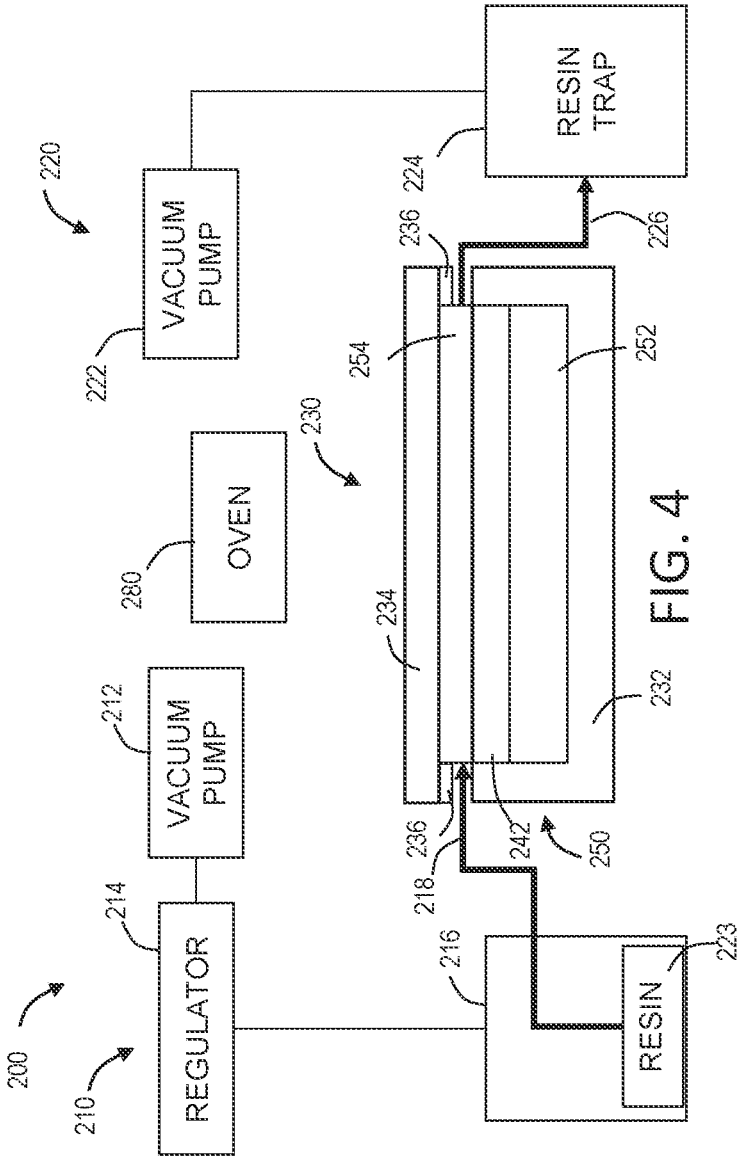
FIG. 4 is a schematic diagram of a second illustrative resin infusion system in accordance with the present teachings, depicted before resin infusion.
Figure 5:
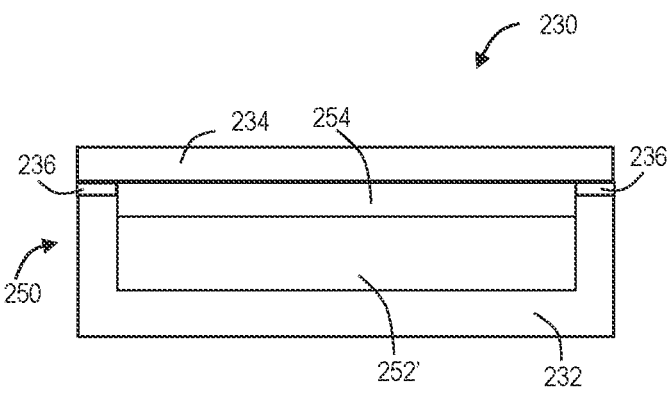
FIG. 5 is a schematic diagram of an illustrative vacuum apparatus suitable for inclusion in the resin infusion system of FIG. 4, depicted after resin infusion.

As schematically illustrated in FIGS. 4 and 5, this section describes an illustrative resin infusion system 200. Resin infusion system 200 is a system suitable for manufacturing the resin-infused parts having integral protective coatings described above. Resin infusion system 200 is substantially similar to resin infusion system 100, except as described below.

Resin infusion system 200 includes a resin inlet system 210 and a resin outlet system 220, the resin inlet system and resin outlet system operatively coupled to a vacuum apparatus 230, such that resin 223 is passed through the vacuum apparatus from inlet to outlet when the resin infusion system is in use. Vacuum apparatus 230 includes a sealed tool or airtight tool configured to maintain a vacuum. Vacuum apparatus 230 maintains an atmosphere under vacuum, containing a laminate 250 through which resin is infused by resin inlet system 210 and resin outlet system 220. Accordingly, resin infusion system 200 infuses or impregnates the laminate with resin by passing resin through vacuum apparatus 230 under a vacuum. In the present example, laminate 250 includes at least a fibrous preform 252 and a curable protective film 254 applied to the fibrous preform.

With reference to FIG. 4, resin infusion system 200 includes resin inlet system 210 and resin outlet system 220, each of which is operatively coupled to vacuum apparatus 230. Resin inlet system 210 and resin outlet system 220 are substantially similar to resin inlet system 110 and resin outlet system 120, as described above with reference to FIG. 1. Resin inlet system 210 and resin outlet system 220 are configured to collectively apply a vacuum to vacuum apparatus 230, such that gas (e.g., air) within the vacuum apparatus is removed and resin is caused to flow through the vacuum apparatus.

Resin inlet system 210 includes an inlet-side vacuum pump 212 and a regulator 214 coupled to a resin reservoir 216. A resin inlet line 218 couples resin reservoir 216 to vacuum apparatus 230. Regulator 214 varies a vacuum force applied by vacuum pump 212, such that an inlet pressure of resin inlet system 210 may be controlled by adjusting the regulator. Suitable inlet pressures and pressure differentials are described above with respect to FIG. 1 and resin inlet system 110.

Resin outlet system 220 includes an outlet-side vacuum pump 222 and a resin trap 224. A resin outlet line 226 couples vacuum apparatus 230 to resin trap 224. Inlet-side vacuum pump 212 and outlet-side vacuum pump 222 collectively apply a pressure differential to the resin infusion system, causing resin 223 to flow through the system between resin reservoir 216 and resin trap 224. Resin trap 224 is configured to trap excess resin extracted from the vacuum apparatus by vacuum pump 222. Accordingly, resin trap 224 may include any suitable receptacle, such as a canister, container, bucket, and/or the like. In some examples, vacuum apparatus 230 includes an internal break zone configured to prevent resin from leaving the vacuum apparatus.

In the example depicted in FIGS. 4 and 5, vacuum apparatus 230 is a tool configured to be sealed such that the tool maintains a vacuum during resin infusion. Accordingly, vacuum apparatus 230 includes a tool 232 configured to receive laminate 250, a caul plate 234 disposed on top of the laminate, and a vacuum seal 236 disposed between the tool and the caul plate such that the vacuum seal seals gaps between the caul plate and the tool. The caul plate is configured to apply pressure to laminate 250 during resin infusion. In some examples, tool 232 and caul plate 234 are released (i.e., coated or integrally made of a release coating or coatings), such that laminate 250 does not adhere to the tool or caul plate. Release coatings may include any suitable films configured to resist adhesive bonding, such as silicone, polytetrafluoroethylene (PTFE), polyvinyl acrylate (PVA), and/or the like. Resin inlet line 218 and resin outlet line 226 extend between vacuum seal 236 and tool 232, such that resin may flow into and out of the sealed vacuum apparatus. Vacuum seal 236 may comprise any suitable mechanical seal, such as a gasket, rubber seal, hermetic seal, inflatable seal, and/or the like.

FIG. 4 depicts resin infusion system 200 during the resin infusion process. Accordingly, resin inlet line 218 and resin outlet line 226 are sandwiched between vacuum seal 236 and tool 232. In the example depicted in FIG. 4, infusing resin into vacuum apparatus 230 causes a resin gap 242 to form between curable protective film 254 and fibrous preform 252. While under vacuum, the resin infuses into the fibrous preform, impregnating the fibrous preform.

FIG. 5 depicts laminate 250 after resin infusion. Accordingly, fibrous preform 252' is impregnated with resin and curable protective film 254 is adhered to the fibrous preform. As vacuum apparatus 230 removes gases (e.g., air) from pores within fibrous preform 252', a thickness of layers within the vacuum apparatus decreases. In some examples, vacuum seal 236 may be resilient, and may decrease in thickness as the layer thicknesses decrease. Accordingly, though tool 232 and caul plate 234 may be rigid, vacuum seal 236 accommodates shape changes of laminate 250.

In some examples, laminate 250 is configured to be cured while under a vacuum or otherwise sealed. As vacuum apparatus 230 includes a gap between vacuum seal 236 and tool 232 through which resin inlet line 218 and resin outlet line 226 extend, in some examples, the tool may be compressed (e.g., with a clamp, vise, etc.) such that resin inlet line 218 and resin outlet line 226 may be removed before curing. While the vacuum assembly depicted in FIGS. 4 and 5 contains fibrous preform 252, 252', curable protective film 254, and resin gap 242, additional layers may be included within the vacuum assembly. In some examples, vacuum assembly 230 includes a flow media such as flow media 142, described above with respect to FIGS. 1-3. In some examples, vacuum assembly 230 includes a porous release film, such as porous release film 144, described above.

Laminate 250 includes fibrous preform 252 and at least one curable protective film 254. Fibrous preform 252 comprises a plurality of dry fibers configured to be adhered together by a resin matrix after resin infusion. The dry fibers are free from resin before resin infusion. The fibrous preform generally defines the shape of the completed resin-infused part. Fibrous preform 252 may include dry fibers arranged in any suitable shape for reinforcing a resin-infused part. Fibers may be aligned along one or more axes of the part (e.g., x-, y-, and z-axes), thereby modifying structural characteristics of the finished material. In some examples, the dry fibers are manufactured together in sheets, mats, cloths, and/or the like using any suitable manufacturing technique such as weaving, knitting, braiding, stitching, etc. In some examples, the fibrous preform comprises one or more laminated sheets of fibrous material. In some examples, the fibrous preform comprises any suitable fibrous reinforcement material, such as carbon fiber, basalt, fiberglass, aramid fibers (e.g., Kevlar), and/or the like.

Curable protective film 254 is disposed on top of fibrous preform 252. Curable protective film 254 is configured to protect the resin-infused part after infusion (e.g., from environmental damage). In some examples, curable protective film 254 is configured to be a curable surfacing film.

Accordingly, curable protective film 254 may comprise epoxide resins (e.g., aliphatic epoxides, aromatic epoxides, etc.), and curing the fibrous preform and the curable protective film forms an epoxy surfacing layer. In these examples, curable protective film 254 may include an ultraviolet-visible light (UV-vis)-blocking additive, such as butylated hydroxytoluene (BHT), 2-hydroxy-4-methoxy-benzophenone (UV-9), 2,4-Bis(2,4-dimethylphenyl)-6-(2-hydroxy-4-octyloxyphenyl)-1,3,5-triazine, 3,5-Di-tert-butyl-4-hydroxybenzoic acid, n hexadecyl ester, titanium dioxide, carbon black, and/or the like. In some examples, curable protective film 254 is configured to be a curable paint replacement film. Accordingly, curable protective film 254 may comprise polyurethane prepolymers. In these examples, curable protective film 254 may further comprise strengthening agents configured to increase a cure temperature of the polyurethane prepolymers. In some examples, curable protective film 254 may be draped over fibrous preform 252. Before curable protective film 254 is cured, the film comprises a prepolymer film. Co-curing curable protective film 254 with the resin-infused part causes curable protective film 254 to crosslink and become rigid.

Curable protective film 254 may be substantially similar to curable protective film 154, as described above. Accordingly, in some examples, curable protective film 254 includes a reinforcement layer or scrim (e.g., similar to scrim 156). In some examples, curable protective film 254 includes a tack or adhesive layer (e.g., similar to tack layer 158).

In some examples, laminate 250 further comprises an additional curable protective film layered (e.g., similar to protective film 164) onto curable protective film 254. In these examples, the first curable protective film comprises epoxide resins and the second curable protective film comprises polyurethane prepolymers. Accordingly, the first curable protective film comprises a surfacing film and the second curable protective film comprises a paint replacement film.

In some examples, resin infusion system 200 further comprises an oven 280 configured to heat vacuum assembly 230, thereby curing curable protective film 254 and fibrous preform 252 after resin infusion. A curing temperature of oven 280 is selected based on the components of laminate 250. In some examples, a curing temperature of oven 280 is from 345° F. to 365° F. (174 to 185° C.). In some examples, curing the laminate includes a single curing step. Accordingly, in some examples, the curing temperature is 180° C. (356° F.), with a heating rate from 1 to 5° F./minute. In other words, the curing temperature gradually increases throughout the curing time. In some examples, curing the laminate is a two-step process, including a cure and a post-cure. In these examples, a curing temperature of oven 280 is from 212° F. to 320° F. (100 to 160° C.). Oven 280 may be further configured to post-cure laminate 250 at a curing temperature of 345 to 365° F. (174 to 185° C.). The oven may maintain the laminate at the post-curing temperature for approximately 60 to 120 minutes.

C. First Illustrative Method

This section describes steps of a first illustrative method 400 for manufacturing resin-infused parts having integral protective coatings; see FIGS. 6-10. Aspects of resin infusion system 100 and resin infusion system 200 may be utilized in the method steps described below. Where appropriate, reference may be made to components and systems that may be used in carrying out each step. These references are for illustration, and are not intended to limit the possible ways of carrying out any particular step of the method.

Figure 6:
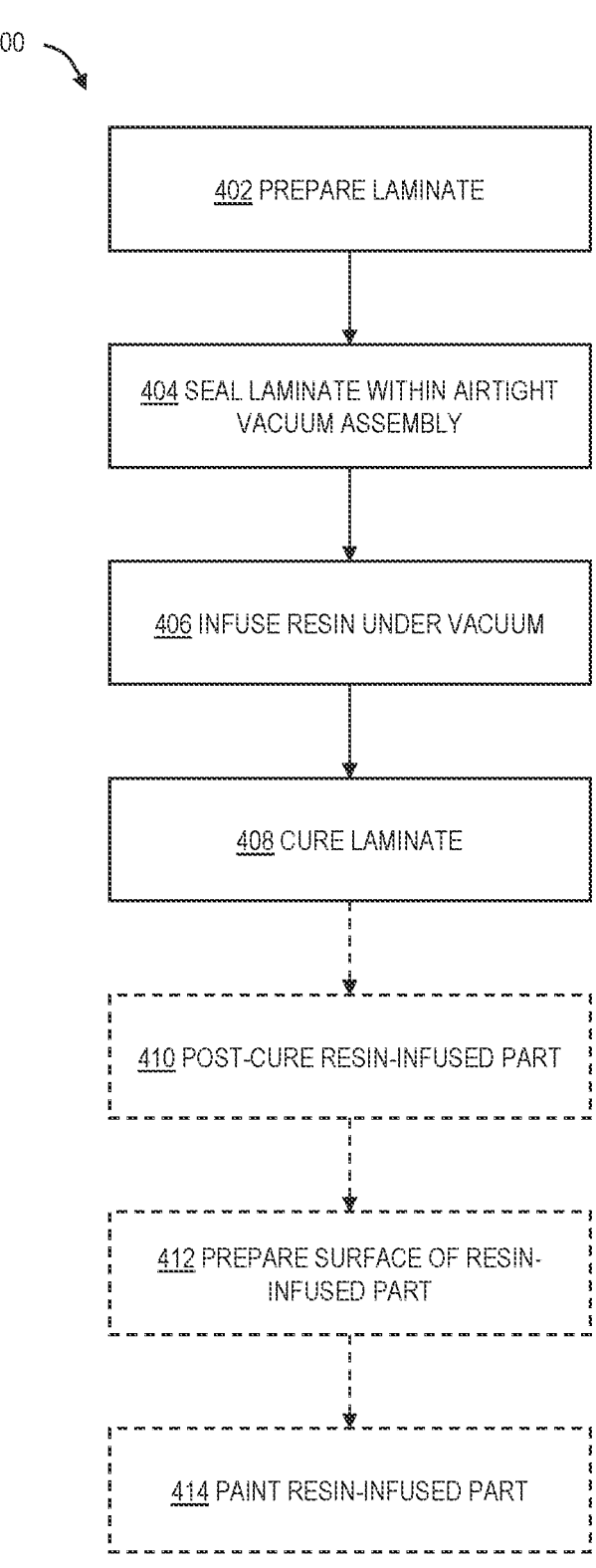
FIG. 6 is a flow chart depicting steps of a first illustrative method for manufacturing a resin-infused part having an integral protective coating in accordance with the present teachings.

In FIG. 6, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 6 are not limiting and other methods and steps are within the scope of the present disclosure, including methods having greater than or fewer than the number of steps illustrated, as understood from the discussions herein.

Figure 7:
FIG. 7 is a schematic diagram of an illustrative laminate after step 402 of the method depicted in FIG. 6.

Step 402 of method 400 includes preparing a laminate by layering a curable protective film onto a fibrous preform. In some examples, preparing the laminate includes layering the curable protective film directly onto a fibrous preform. As the curable protective film may be pliable before curing, layering the curable protective film directly onto the fibrous preform may include draping the curable protective film onto the fibrous preform. In some examples, preparing the laminate includes layering the curable protective film onto a released caul plate, mold, tool, and/or any other suitable upper layer of a lay-up and securing the released caul plate over the fibrous preform. An example of a laminate prepared using step 402 is shown in FIG. 7, which depicts a laminate 500 including a curable protective film 510 layered onto a fibrous preform 520.

In some examples, preparing the laminate includes providing the fibrous preform. In some examples, providing the fibrous preform includes laying reinforcement fibers into a mold. In some examples, providing the fibrous preform includes preparing a mat, cloth, sheet and/or the like by weaving, braiding, knitting, sewing and/or any other suitable method. In some examples, providing the fibrous preform includes layering one or more mats on top of each other.

In some examples, preparing the laminate includes providing the curable protective film. The curable protective film may be substantially as described above with respect to curable protective film 154. The curable protective film is configured to protect the resin-infused part from environmental damage (e.g., during storage, transport, etc.). The curable protective film may comprise any suitable materials configured to adhere to the fibrous preform upon resin infusion. In some examples, the curable protective film is configured to act as a surfacing film. Accordingly, in some examples, the curable protective film comprises epoxide resins. As epoxide materials are susceptible to environmental degradation, including damage due to exposure to ultraviolet-visible light (UV-vis), the curable protective film may further comprise UV-blocking additives, such as butylated hydroxytoluene (BHT), 2-hydroxy-4-methoxy-benzophenone (UV-9), 2,4-Bis(2,4-dimethylphenyl)-6-(2-hydroxy-4-octyloxyphenyl)-1,3,5-triazine, 3,5-Di-tert-butyl-4-hydroxybenzoic acid, n hexadecyl ester, titanium dioxide, carbon black, and/or the like. In some examples, the curable protective film is configured to act as a paint replacement and/or primer. Accordingly, the curable protective film may comprise polyurethane prepolymers (e.g., at least one isocyanate, at least one polyol, etc.). In some examples, polyurethane prepolymers may cure at a lower temperature than a resin matrix of the resin-infused part. Accordingly, the curable protective film may include additives configured to modify a curing temperature of the film such that the film is co-curable with the resin matrix.

In some examples, the curable protective film comprises one or more layers. Accordingly, the curable protective film may comprise a prepolymer layer layered onto a first surface of a reinforcement layer (e.g., a scrim) configured to strengthen the curable protective film. In some examples, the reinforcement layer is configured to act as a resin barrier, preventing infused resin from permeating the prepolymer layer. Accordingly, in some examples, the reinforcement layer includes a thermoplastic film comprising any suitable material impermeable to resin, such as acrylic, nylon, polyethylene, and/or the like. In some examples, the reinforcement layer is configured to have structural characteristics similar to the underlying fibrous preform. Accordingly, the reinforcement layer may comprise a woven scrim configured to stretch along axes aligned with the underlying fibrous preform. In some examples, the reinforcement layer comprises a suitable substrate onto which the prepolymer layer may be applied, such as a thermoplastic film, fabric (e.g., woven, knitted, etc.), and/or the like.

In some examples, the reinforcement layer resists adhering to the resin matrix. Accordingly, the curable protective film may further comprise an adhesive and/or tack layer applied to a second surface of the reinforcement layer. The adhesive layer may include any suitable adhesive configured to adhere the protective film to the resin and/or the fibrous preform, such as pressure-sensitive adhesive materials (e.g., epoxies, acrylics, polyurethane, etc.) and/or the like.

In some examples, preparing the laminate includes layering two or more curable protective films onto the fibrous preform. In some examples, preparing the laminate includes layering a curable surfacing film comprising epoxide resins onto the fibrous preform, and layering a paint replacement film comprising polyurethane prepolymers onto the curable surfacing film.

In some examples, preparing the laminate includes layering the fibrous preform onto one or more underlying substrate layers configured to facilitate resin flow into the fibrous preform. In some examples, preparing the laminate includes disposing a porous release film beneath the fibrous preform, wherein the porous release film is evenly perforated to filter the resin and provide an even flow of resin into the fibrous preform. In some examples, preparing the laminate includes disposing a flow media beneath the porous release film, wherein the flow media is configured to facilitate resin flow into the fibrous preform. In some examples, the flow media comprises a polymer mesh.

In some examples, preparing the laminate includes covering the curable protective film with a caul plate, which may compress the laminate into a desired shape or configuration. In some examples, the caul plate is coated with a release coating and may be referred to as a released caul plate. In some examples, the curable protective film includes an adhesive or tack layer disposed on a top surface of the curable protective film. Accordingly, the curable protective film may adhere to a released tool, facilitating moving and/or handling the released tool and curable protective film as a single unit. In these examples, the curable protective film may be adhered directly to the caul plate, and placing the caul plate onto the fibrous preform layers the curable protective film onto the fibrous preform. In some examples, covering the curable protective film with a caul plate includes bolting or otherwise fastening the caul plate to an underlying surface, such as a released tool. In some examples, covering the curable protective film with a caul plate includes placing the caul plate over the curable protective film, and covering the caul plate with a tool or mold.

Step 404 of method 400 includes sealing the laminate within an airtight vacuum assembly. Sealing the laminate within the airtight vacuum assembly ensures removal of any trapped gases within the resulting resin-infused part to eliminate porosity in the part. In some examples, sealing the laminate within an airtight vacuum assembly includes placing the laminate into a vacuum bag and taping edges of the vacuum bag to an underlying tool, forming an airtight vacuum assembly. In some examples, sealing the vacuum assembly includes placing the laminate into a released tool and sealing edges of the tool, thereby forming an airtight vacuum assembly. In some examples, covering the curable protective film with a caul plate as described above with respect to step 402 may include sealing the caul plate to the released tool, forming an airtight vacuum assembly.

Step 406 of method 400 includes infusing resin into the laminate under a vacuum. Infusing resin into the laminate under a vacuum causes the resin to impregnate the fibrous preform and the curable protective film to adhere to the fibrous preform. Infusing resin into the laminate may be performed using any suitable resin infusion system, such as resin infusion system 100 described above. Infusing resin into the laminate under a vacuum removes gases (e.g., air) from the fibrous preform while infusing resin into spaces within the fibrous preform which were previously occupied by the gases. Accordingly, infusing resin into the laminate forms a dense resin matrix immobilizing the fibrous preform. Infusing resin into the laminate may include infusing any suitable resin for use in fibrous composites, such as epoxy resin, vinyl ester, thermosetting polyester, and/or the like.

In some examples, infusing resin into the laminate under a vacuum includes passing the resin through flow media configured to carry the resin from a resin inlet to a resin outlet. As resin infuses into the fibrous preform, it travels from bottom portions of the preform to top portions of the preform. Accordingly, resin fully or substantially fully impregnates the fibrous preform before contacting the curable protective film. Generally, the curable protective film is configured to vitrify and/or gel before the resin reaches a minimum infusion viscosity, such that the resin does not bleed through the curable protective film. In some examples, the curable protective film includes an adhesive or tack layer disposed on a bottom surface of the curable protective film. Accordingly, the curable protective film adheres to the resin-infused fibrous preform when the resin contacts the curable protective film. In some examples, the curable protective film comprises a prepolymer material having adhesive properties. In these examples, the prepolymer material adheres the curable protective film to the resin-infused fibrous preform when the resin contacts the curable protective film.

Figure 8:
FIG. 8 is a schematic diagram of an illustrative infused laminate after step 406 of the method depicted in FIG. 6.

FIG. 8 depicts an illustrative laminate 600 after resin infusion, specifically the laminate of FIG. 7 after resin infusion as in step 406. Laminate 600 includes a curable protective film 610 adhered to a top surface of a resin-infused fibrous preform 620. Resin-infused fibrous preform 620 is fully impregnated by a resin matrix. Curable protective film 610 is adhered to resin-infused fibrous preform 620 by an adhesive layer or by adhesive properties of the curable protective film. Both resin-infused fibrous preform 620 and curable protective film 610 comprise curable prepolymers.

Step 408 of method 400 includes curing the infused laminate at a curing temperature. After step 406, both the curable protective film and the resin-infused fibrous preform comprise prepolymers. Curing the infused laminate causes the resin matrix and the curable protective film to polymerize, forming a thermoset polymer matrix. Curing the resin matrix forms a rigid matrix immobilizing the fibrous preform. Curing the curable protective film increases the strength and rigidity of the protective film, and conforms the protective film to the shape of the resin-infused fibrous preform, thereby integrating the protective film with the resin-infused fibrous preform. In some examples, the curable protective film comprises epoxide resins, and curing the infused laminate causes the epoxide resins to polymerize to form a thermosetting polymer coating layer. In some examples, the curable protective film comprises polyurethane prepolymers, and curing the laminate causes the prepolymer layer to polymerize, such that a polyurethane thermosetting coating layer is formed.

In some examples, the infused laminate is cured while the laminate is still under a vacuum. Accordingly, the infused laminate is cured while still contained within the airtight vacuum assembly. Curing the infused laminate while the laminate is still under a vacuum prevents oxidation and discoloration associated with thermal decomposition. Curing the infused laminate may include any suitable method for curing a polymer, such as heating, autoclaving, chemical-mediated curing, UV-based curing, and/or the like. In some examples, curing the laminate includes heating the laminate in an oven. In some examples, curing the laminate includes heating the laminate at a maximum curing temperature of about 180° C. (356° F.). In some examples, the maximum curing temperature is from 345 to 365° F. (174 to 185° C.). In some examples, curing the laminate includes a single curing step. Accordingly, in some examples, the maximum curing temperature is 180° C. (356° F.), with a heating rate from 1 to 5° F./minute. In other words, the curing temperature gradually increases throughout the curing time. In some examples, curing the laminate is a two-step process, including a cure and a post-cure. In these examples, the maximum initial curing temperature (i.e., before the post-cure) is from 212° F. to 320° F. (100 to 160° C.).

Figure 9:
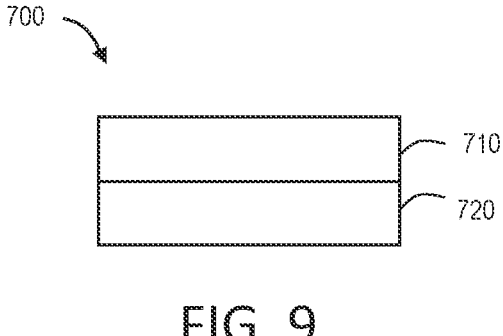
FIG. 9 is a schematic diagram of an illustrative cured laminate after step 408 of the method depicted in FIG. 6.

FIG. 9 depicts an illustrative laminate 700 after curing. Laminate 700 is substantially identical to laminates 500, 600, except as otherwise described. Laminate 700 depicts the laminates of FIGS. 7 and 8 after resin infusion as in step 406 and curing as in step 408. Laminate 700 includes an integral protective coating layer 710 adhered to a resin-infused part 720. Integral protective coating layer comprises a crosslinked thermoset coating which is adhered to resin-infused part 720. Resin-infused part 720 includes a crosslinked resin matrix immobilizing a fibrous reinforcement structure as provided by a fibrous preform. Accordingly, after curing, protective coating layer 710 is integrated with resin-infused part 720.

In some examples, optional step 410 of method 400 includes post-curing the laminate. As described above, when curing the laminate is a two-step process, the maximum initial curing temperature is below 180° C. (356° F.). For example, the maximum initial curing temperature may be from 212° F. to 320° F. (100 to 160° C.). Post-curing the laminate includes heating the laminate for approximately 60 to 120 minutes at approximately 180° C. (356° F.). In some examples, post-curing the laminate includes heating the laminate at temperatures from 345 to 365° F. (174 to 185° C.). Post-curing the laminate further polymerizes the resin matrix and protective film, increasing rigidity and crosslinking. In some examples, the laminate is post-cured after removal from a vacuum apparatus.

In some examples, optional step 412 of method 400 includes preparing a surface of the resin-infused part. In some examples, preparing the surface of the resin-infused part includes cleaning the surface with a solvent. In some examples, the solvent is configured to remove release layer residue transferred from the released caul plate, the released tool, and/or any other released portions of the airtight vacuum assembly. In some examples, the solvent is configured to remove contaminants such as dust, debris, and/or the like which may have accumulated on the surface of the resin-infused part during storage. In some examples, preparing a surface of the resin-infused part includes sanding the resin-infused part to remove surface defects and/or coatings.

In some examples, optional step 414 of method 400 includes painting the resin-infused part. Painting the resin-infused part includes applying a paint film, topcoat, or other coating to the resin-infused part. In some examples, painting the resin-infused part includes applying a topcoat over a protective coating layer applied in previous steps. In some examples, painting the resin-infused part may take place weeks to months after completion of step 408 and optional step 410. The resin-infused part may be safely stored, with the protective coating layer protecting the surface of the resin-infused part from damage. In some examples, painting the resin-infused part may include applying a topcoat directly to the protective coating layer without sanding.

Figure 10:
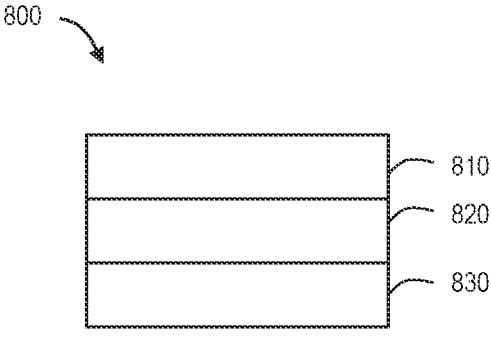
FIG. 10 is a schematic diagram of an illustrative painted resin-infused part after step 412 of the method depicted in FIG. 6.

FIG. 10 depicts an illustrative resin-infused part 800. Resin-infused part 800 is substantially identical to laminate 700 of FIG. 9, with a topcoat 810 applied over the protective coating layer. Accordingly, resin-infused part 800 includes a topcoat 810 applied to a protective coating layer 820, which is bonded to or adhered to a resin-infused part 830.

D. Second Illustrative Method

Figure 11:
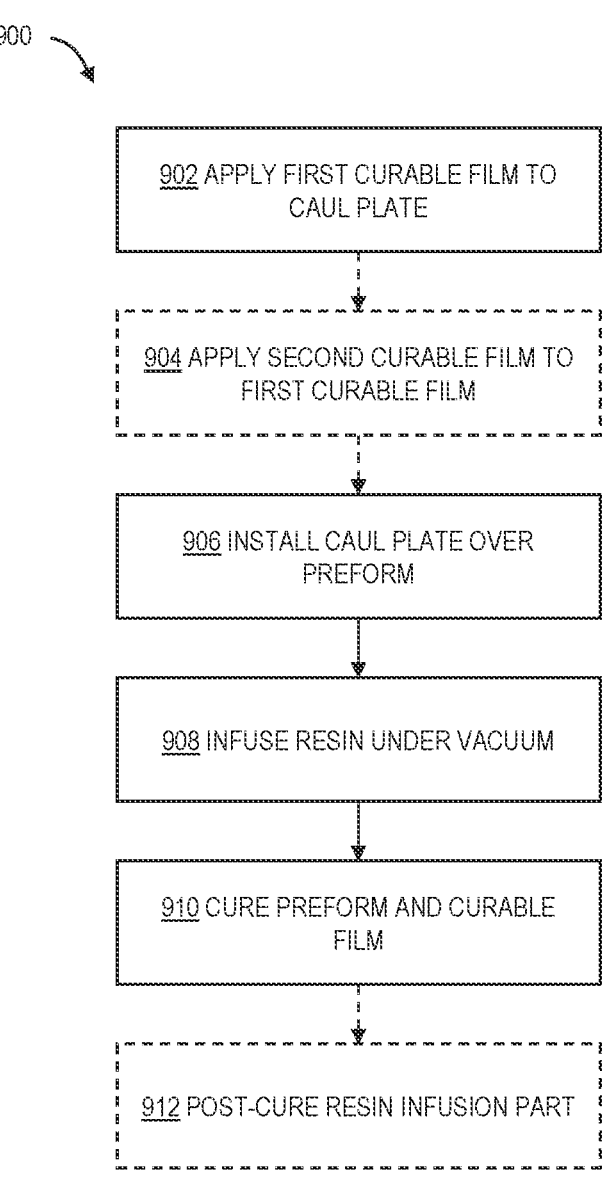
FIG. 11 is a flow chart depicting steps of a second illustrative method for manufacturing a resin-infused part having an integral protective coating in accordance with the present teachings.

This section describes steps of a second illustrative method 900 for manufacturing resin-infused parts having integral protective coatings; see FIG. 11. Aspects of resin infusion system 100, resin infusion system 200, method 400, laminates 500, 600, and 700, and/or resin-infused part 800 may be utilized in the method steps described below. Where appropriate, reference may be made to components and systems that may be used in carrying out each step. These references are for illustration, and are not intended to limit the possible ways of carrying out any particular step of the method.

FIG. 11 schematically provides a flowchart that represents illustrative, non-exclusive examples of methods according to the present disclosure. In FIG. 11, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 11 are not limiting and other methods and steps are within the scope of the present disclosure, including methods having greater than or fewer than the number of steps illustrated, as understood from the discussions herein.

Step 902 of method 900 includes applying a first curable film to a caul plate. The first film may be similar to curable films described above, such as curable film 154 and curable film 510. Accordingly, as described above, the first curable film may be drapable such that the film may be draped over an interior surface of the caul plate. In some examples, the caul plate further comprises a release layer configured to resist adhesive properties of the first curable film. The release layer may comprise any suitable coating configured to resist adhesive bonding, such as silicone, polytetrafluoroethylene (PTFE), polyvinyl acrylate (PVA), and/or the like. In some examples, a release layer is applied to the first curable film. In some examples, a tack layer is applied to the first curable film and/or the first curable film is configured to have adhesive properties with respect to the caul plate, facilitating movement of the caul plate without causing a shifting of the film. As described above, the first curable film may comprise any suitable material configured to protect an underlying resin-infused part from environmental damage. In some examples, the first curable film comprises epoxide resins and is configured to form a surfacing layer upon curing. In these examples, the first curable film may further comprise UV-blocking additives, such as butylated hydroxytoluene (BHT), 2-hydroxy-4-methoxy-benzophenone (UV-9), 2,4-Bis(2,4-dimethylphenyl)-6-(2-hydroxy-4-octyloxyphenyl)-1,3,5-triazine, 3,5-Di-tert-butyl-4-hydroxybenzoic acid, n hexadecyl ester, titanium dioxide, carbon black, and/or the like. In some examples, the first curable film comprises polyurethane prepolymers, and is configured to form a polyurethane paint replacement layer upon curing. In some examples, the first curable film comprises a prepolymer layer, a resin blocking layer, and a tack layer applied to a bottom surface of the resin blocking layer. In some examples, the resin blocking layer comprises a thermoplastic film. In some examples, the tack layer comprises an adhesive applied to the resin blocking layer, such as a pressure-sensitive adhesive, contact adhesive, heat bonded adhesive, and/or the like.

In some examples, optional step 904 of method 900 includes applying a second curable film to the first curable film. In these examples, the first curable film comprises polyurethane prepolymers, such that the first curable film forms a polyurethane paint replacement layer upon curing, and the second curable film comprises epoxide resins, such that the second curable film forms an epoxy surfacing layer upon curing. In other words, the first curable film comprises a paint replacement film and the second curable film comprises a surfacing film.

Step 906 of method 900 includes installing the caul plate over a fibrous preform. As the first curable film has been previously applied to the caul plate, installing the caul plate over the fibrous preform results in a layering of the first curable film onto the fibrous preform. In some examples, such as when a second curable film has been applied to the first curable film, installing the caul plate over the fibrous preform layers the combined first and second curable films onto the fibrous preform. In some examples, installing the caul plate over the fibrous preform includes sealing the caul plate and the fibrous preform within a vacuum bag. In some examples, installing the caul plate over the fibrous preform includes sealing the caul plate and the fibrous preform within an airtight tool configured to maintain a vacuum. In some examples, installing the caul plate over the fibrous preform includes sealing the caul plate to an underlying tool, such that the fibrous preform is received by an airtight compartment formed by the caul plate and the underlying tool.

Step 908 of method 900 includes infusing resin into the fibrous preform under vacuum, such that the fibrous preform is impregnated by the resin and the first curable film adheres to the fibrous preform. Step 908 is substantially identical to step 406 of method 400 except as otherwise described. Accordingly, step 908 includes removing gases from the fibrous preform while infusing resin into spaces within the fibrous preform which were previously occupied by the gases. Accordingly, infusing resin into the fibrous preform forms a dense resin matrix immobilizing the fibrous preform. The resin infuses into the fibrous preform from the bottom, contacting the first (or second) curable film after the fibrous preform has been substantially permeated by the resin matrix. When the resin contacts the curable film, the curable film bonds to the resin-infused fibrous preform, integrating the film with the resin-infused part. In some examples, the resin contacts a pressure-sensitive adhesive applied to a bottom surface of the curable film, activating the adhesive. In some examples, the resin adheres to a prepolymer layer within the curable film.

Step 910 of method 900 includes curing the fibrous preform and the first curable film. Step 910 is substantially identical to step 408 of method 400 except as otherwise described. Accordingly, curing the fibrous preform and the first curable film causes the resin matrix and the first curable film to polymerize, forming a thermoset polymer matrix. Curing the resin matrix forms a rigid matrix immobilizing the fibrous preform. In some examples, the first curable film comprises epoxide resins, and curing the fibrous preform and the first curable film forms an epoxy surfacing layer. In some examples, the curable film comprises polyurethane prepolymers, and curing the fibrous preform and the first curable film forms a polyurethane paint replacement layer. In some examples, step 910 of method 900 further comprises curing the second curable film. In some examples, the second curable film comprises epoxide resins, and curing the second curable film forms an epoxy surfacing layer. Curing the fibrous preform and the first curable film may include any suitable method for curing a polymer, such as heating, autoclaving, chemical-mediated curing, UV-based curing, and/or the like.

In some examples, optional step 912 of method 900 includes post-curing the resin-infused part.

E. Third Illustrative Method

Figure 12:
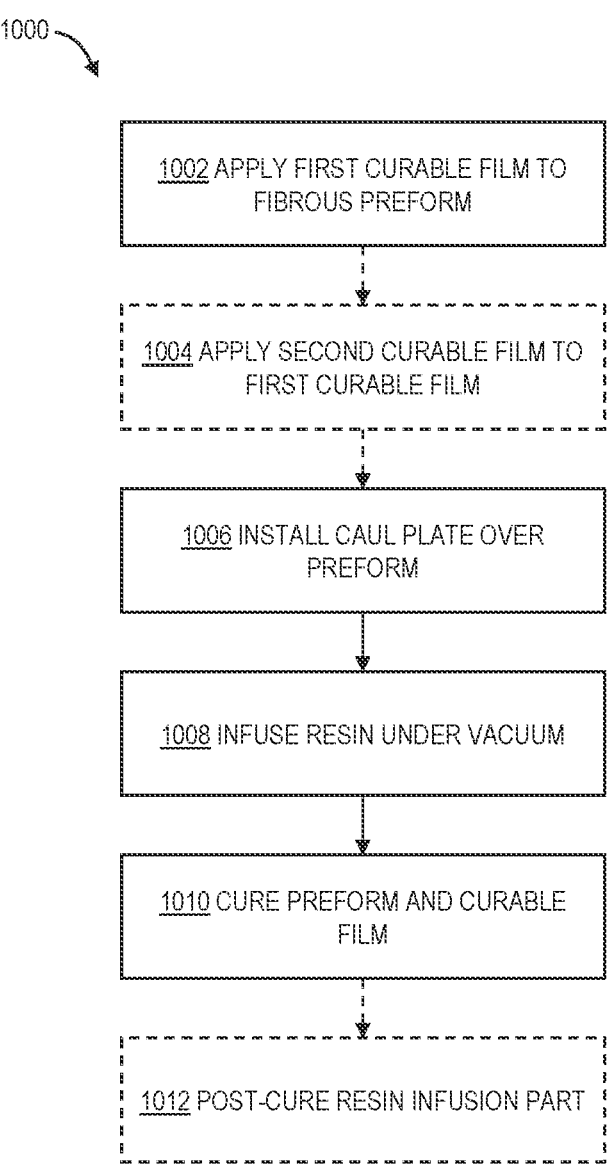
FIG. 12 is a flow chart depicting steps of a third illustrative method for manufacturing a resin-infused part having an integral protective coating in accordance with the present teachings.

This section describes steps of a third illustrative method 1000 for manufacturing resin-infused parts having integral protective coatings; see FIG. 12. Aspects of resin infusion system 100, resin infusion system 200, method 400, method 900, laminates 500, 600, and 700, and/or resin-infused part 800 may be utilized in the method steps described below. Where appropriate, reference may be made to components and systems that may be used in carrying out each step. These references are for illustration, and are not intended to limit the possible ways of carrying out any particular step of the method.

FIG. 12 schematically provides a flowchart that represents illustrative, non-exclusive examples of methods according to the present disclosure. In FIG. 12, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 12 are not limiting and other methods and steps are within the scope of the present disclosure, including methods having greater than or fewer than the number of steps illustrated, as understood from the discussions herein.

Step 1002 of method 1000 includes applying a first curable film to a fibrous preform. The first suitable film may be similar to curable films described above, such as curable film 154 and curable film 510. Accordingly, as described above, the first curable film may be drapable, such that the film may be draped over a top surface of the fibrous preform. As described above, the first curable film may comprise any suitable material configured to protect an underlying resin-infused part from environmental damage.

In some examples, the first curable film comprises epoxide resins and is configured to form a surfacing layer upon curing. In these examples, the first curable film may further comprise UV-blocking additives, such as butylated hydroxytoluene (BHT), 2-hydroxy-4-methoxy-benzophenone (UV-9), 2,4-Bis(2,4-dimethylphenyl)-6-(2-hydroxy-4-octyloxyphenyl)-1,3,5-triazine, 3,5-Di-tert-butyl-4-hydroxybenzoic acid, n hexadecyl ester, titanium dioxide, carbon black, and/or the like. In some examples, the first curable film comprises polyurethane prepolymers, and is configured to form a polyurethane paint replacement layer upon curing. In some examples, the first curable film comprises a thermo-setting layer (AKA prepolymer layer), a scrim layer (AKA a resin blocking layer), and an adhesive layer (AKA a tack layer) applied to a bottom surface of the scrim layer. In some examples, the scrim layer comprises a thermoplastic film, such that the scrim layer blocks resin from penetrating the thermosetting layer. In some examples, the scrim layer comprises a woven fabric. In some examples, the tack layer comprises an adhesive applied to the scrim layer, such as a pressure-sensitive adhesive, contact adhesive, heat bonded adhesive, and/or the like.

In some examples, optional step 1004 of method 1000 includes applying a second curable film to the first curable film. In these examples, the first curable film comprises epoxide resins, such that the first curable film forms an epoxy surfacing layer upon curing, and the second curable film comprises polyurethane prepolymers, such that the second curable film forms a polyurethane paint replacement layer upon curing, and the second curable film comprises epoxide resins. In other words, the first curable film comprises a surfacing film and the second curable film comprises a paint replacement film.

Step 1006 of method 1000 includes installing a caul plate over the fibrous preform. Generally, installing a caul plate over the fibrous preform includes layering the caul plate over the fibrous preform such that the fibrous preform is compressed by the weight of the caul plate and a smooth internal surface of the caul plate is directly contacting the first curable film or the second curable film. In some examples, the caul plate comprises a release layer, which may comprise any suitable coating configured to resist adhesive bonding, such as silicone, polytetrafluoroethylene (PTFE), polyvinyl acrylate (PVA), and/or the like. In some examples, installing the caul plate over the fibrous preform further comprises sealing the caul plate and the fibrous preform within a vacuum bag. In some examples, installing the caul plate over the fibrous preform further comprises sealing the caul plate and the fibrous preform within an airtight tool configured to maintain a vacuum. In some examples, installing the caul plate over the fibrous preform further comprises sealing the caul plate to an underlying tool, such that the fibrous preform is received by an airtight compartment formed by the caul plate and the underlying tool.

Step 1008 of method 1000 includes infusing resin into the fibrous preform under a vacuum, such that the resin permeates the fibrous preform and the curable film adheres to the fibrous preform. Step 1008 is substantially identical to step 406 of method 400 and step 908 of method 900 except as otherwise described. Accordingly, step 1008 includes removing gases from the fibrous preform while infusing resin into spaces within the fibrous preform which were previously occupied by the gases. Accordingly, infusing resin into the fibrous preform forms a dense resin matrix immobilizing the fibrous preform. The resin infuses into the fibrous preform from the bottom, contacting the first (or second) curable film after the fibrous preform has been substantially permeated by the resin matrix. When the resin contacts the curable film, the curable film bonds to the resin-infused fibrous preform, integrating the film with the resin-infused part. In some examples, the resin contacts a pressure-sensitive adhesive applied to a bottom surface of the curable film, activating the adhesive. In some examples, the resin adheres to a prepolymer layer within the curable film.

Step 1010 of method 1000 includes curing the fibrous preform and the first curable film. Step 1010 is substantially identical to step 408 of method 400 and step 910 of method 900 except as otherwise described. Accordingly, curing the fibrous preform and the first curable film causes the resin matrix and the first curable film to polymerize, forming a thermoset polymer matrix. Curing the resin matrix forms a rigid matrix immobilizing the fibrous preform. In some examples, the first curable film comprises epoxy resins, and curing the fibrous preform and the first curable film forms an epoxy surfacing layer. In some examples, the curable film comprises polyurethane prepolymers, and curing the fibrous preform and the first curable film forms a polyurethane paint replacement layer. In some examples, step 1010 of method 1000 further comprises curing the second curable film. In some examples, the second curable film comprises epoxide resins, and curing the second curable film forms an epoxy surfacing layer. Curing the fibrous preform and the first curable film may include any suitable method for curing a polymer, such as heating, autoclaving, chemical-mediated curing, UV-based curing, and/or the like.

In some examples, optional step 1012 of method 1000 includes post-curing the resin-infused part.

F. Illustrative Combinations and Additional Examples

This section describes additional aspects and features of methods for manufacturing resin-infused parts having integral protective films, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations. Illustrative, non-exclusive examples of inventive subject matter according to the present disclosure are described in the following enumerated paragraphs:

A0. A method (400) of manufacturing a resin-infused part, the method (400) comprising:

Preparing (402) a laminate (150) by layering a curable protective film (154) onto a fibrous preform (152);

Infusing (406) resin (123) into the laminate (150) under a vacuum, such that the resin (123) impregnates the fibrous preform (152) and the protective film (154) adheres to the fibrous preform (152); and Curing (408) the laminate (150) at a curing temperature.

A1. The method (400) of paragraph A0, further comprising sealing the laminate (150) within a vacuum bag (132).

A2. The method (400) of paragraph A0, further comprising sealing the laminate (150) within a sealed tool.

A3. The method (400) of any of paragraphs A0 through A2, further comprising post-curing (410) the resin-infused part.

A4. The method (400) of any of paragraphs A0 through A3, wherein preparing (402) the laminate (150) further comprises:

disposing a porous release film beneath the fibrous preform (152); and covering the curable protective film (154) with a released caul plate.

A5. The method (400) of any of paragraphs A0 through A4, wherein infusing (406) resin (123) into the laminate (150) under a vacuum comprises passing the resin

US 12,661,880 B2

21

(123) through a flow medium (142) configured to carry the resin (123) from a resin inlet (110) to a resin outlet (120).

A6. The method (400) of any of paragraphs A0 through A5 further comprising painting (414) the resin-infused part.

A7. The method (400) of any of paragraphs A0 through A6, wherein the curable protective film (154) comprises a prepolymer layer (160) and a reinforcement layer (156).

A8. The method (400) of paragraph A7, wherein the prepolymer layer (160) comprises epoxide resins.

A8. The method (400) of paragraph A7, wherein the prepolymer layer (160) further comprises an ultraviolet-visible light (UV-vis)-blocking additive.

A9. The method (400) of paragraph A7 or A8, wherein curing (408) the laminate (150) causes the epoxide resins to polymerize to form a thermosetting polymer coating layer.

A10. The method (400) of paragraph A7, wherein the prepolymer layer (160) comprises at least one isocyanate and at least one polyol.

A11. The method (400) of paragraph A10, wherein curing (408) the laminate (150) causes the prepolymer layer (160) to polymerize, such that a polyurethane thermosetting coating layer is formed.

A12. The method (400) of any of paragraphs A7 through A11, wherein the reinforcement layer (156) comprises a thermoplastic film.

A13. The method (400) of any of paragraphs A7 through A12, wherein the reinforcement layer (156) comprises a scrim (156).

A14. The method (400) of any of paragraphs A7 through A13, wherein the curable protective film (154) further comprises an adhesive layer (158).

A15. The method (400) of any of paragraphs A0 through A14, wherein the curable protective film (154) is configured to vitrify before the resin (123) reaches its minimum infusion viscosity, such that resin (123) does not bleed through the curable protective film (154).

A16. The method (400) of any of paragraphs A0 through A15, wherein curing (408) the laminate (150) includes heating the laminate (150) in an oven (180).

A17. The method (400) of any of paragraphs A0 through A16, wherein the maximum curing temperature is about 360° F.

A18. The method (400) of any of paragraphs A0 through A17, wherein the laminate (150) further comprises an additional curable protective film (164) layered onto the curable protective film (154).

A19. The method (400) of paragraph A18, wherein the curable protective film (154) comprises epoxide resins and the additional curable protective film (164) comprises polyurethane prepolymers.

A20. The method (400) of any of paragraphs A0 through A19, wherein the curable protective film (154) comprises polyurethane prepolymers, and wherein curing (408) the laminate (150) forms a polyurethane paint replacement layer.

B0. A method (900) of manufacturing a resin-infused part, the method (900) comprising:

applying (904) a first curable film (254) to a caul plate (234);

installing (906) the caul plate (234) over a fibrous preform (252);

infusing (908) resin (223) into the fibrous preform (252) under vacuum, such that the fibrous preform (252) is impregnated by the resin (223) and the first curable film (254) adheres to the fibrous preform (252); and curing (910) the fibrous preform (252) and the first curable film (254).

B1. The method (900) of paragraph B0, further comprising sealing the caul plate (234) and fibrous preform (252) within a vacuum bag.

B2. The method (900) of paragraph B0, further comprising sealing the caul plate (234) and fibrous preform (252) within an airtight tool (232).

B3. The method (900) of any of paragraphs B0 through B2, wherein the caul plate (234) further comprises a release layer.

B4. The method (900) of any of paragraphs B0 through B3, further comprising: post-curing (912) the resin-infused part.

B5. The method (900) of any of paragraphs B0 through B4, wherein the first curable film (254) comprises epoxide resins, and wherein curing (910) the fibrous preform (252) and the first curable film (254) forms an epoxy surfacing layer.

B6. The method (900) of any of paragraphs B0 through B5, wherein the first curable film (254) comprises polyurethane prepolymers, and wherein curing (910) the fibrous preform (252) and the first curable film (254) forms a polyurethane paint replacement layer.

B7. The method (900) of any of paragraphs B0 through B6, wherein the first curable film (254) comprises a prepolymer layer, a resin blocking layer, and a tack layer.

B8. The method (900) of paragraph B7, wherein the resin blocking layer comprises a thermoplastic film.

B9. The method (900) of any of paragraphs B0 through B8, wherein the tack layer comprises an adhesive applied to the resin blocking layer.

B10. The method (900) of any of paragraphs B0 through B4 and B6 through B9, further comprising applying a second curable film to the first curable film (254).

B11. The method (900) of paragraph B10, wherein the first curable film (254) comprises polyurethane prepolymers and wherein the second curable film comprises epoxide resins.

B12. The method (900) of paragraph B10 or B11, wherein the first curable film (254) comprises a paint replacement film and wherein the second curable film comprises a surfacing film.

C0. A method (1000) of manufacturing a resin-infused part, the method (1000) comprising:

applying (1002) a first curable film to a fibrous preform;

installing (1006) a caul plate over the first curable film;

infusing (1008) resin into the fibrous preform under vacuum, such that the resin permeates the fibrous preform and the first curable film adheres to fibrous preform;

curing (1010) the fibrous preform and the curable film.

C1. The method (1000) of paragraph C0, further comprising sealing the caul plate and fibrous preform within a vacuum bag.

C2. The method (1000) of paragraph C0, further comprising sealing the caul plate and fibrous preform within an airtight tool.

C3. The method (1000) of any of paragraphs C0 through C2, wherein the caul plate further comprises a release layer.

C4. The method (1000) of any of paragraphs C0 through C3, further comprising post-curing (1012) the resin-infused part.

C5. The method (1000) of any of paragraphs C0 through C4, wherein the first curable film comprises epoxide resins, and wherein curing (1010) the fibrous preform and the first curable film forms an epoxy surfacing layer.

C6. The method (1000) of any of paragraphs C0 through C4, wherein the first curable film comprises polyurethane prepolymers, and wherein curing (1010) the fibrous preform and the first curable film forms a polyurethane paint replacement layer.

C7. The method (1000) of any of paragraphs C0 through C6, wherein the first curable film comprises a thermosetting layer, a scrim layer, and a tack layer.

C8. The method (1000) of paragraph C7, wherein the scrim layer comprises a thermoplastic film, such that the scrim layer blocks resin from penetrating the thermosetting layer.

C9. The method (1000) of paragraph C7, wherein the scrim layer comprises a woven fabric.

C10. The method (1000) of any of paragraphs C0 through C9, wherein the tack layer comprises an adhesive applied to the scrim layer.

C11. The method (1000) of any of paragraphs C0 through C4 and C6 through C10, further comprising applying (1004) a second curable film to the first curable film.

C12. The method (1000) of paragraph C11, wherein the first curable film comprises epoxide resins and wherein the second curable film comprises polyurethane prepolymers.

C13. The method (1000) of paragraph C11 or C12, wherein the first curable film comprises a surfacing film and wherein the second curable film comprises a paint replacement film.

D0. A vacuum assembly (130, 230) prepared for resin infusion, the vacuum assembly (130, 230) including:
a fibrous preform (152, 252);
a curable surfacing film (154, 254) layered over the fibrous preform (152,252); and
a caul plate (170, 234) installed over the curable surfacing film (154, 254).

D1. The vacuum assembly (130, 230) of paragraph D0, wherein the vacuum assembly (130, 230) comprises a vacuum bag (132).

D2. The vacuum assembly (130, 230) of paragraph D0, wherein the vacuum assembly comprises a sealed tool.

D3. The vacuum assembly (130, 230) of any of paragraphs D0 through D2, wherein the caul plate (170, 234) further comprises a release layer.

D4. The vacuum assembly (130, 230) of any of paragraphs D0 through D3, wherein the curable protective film (154, 254) comprises thermosetting resins.

D5. The vacuum assembly (130, 230) of paragraph D4, wherein the curable protective film (154, 254) further comprises an ultraviolet-visible light (UV-vis)-blocking additive.

D6. The vacuum assembly (130, 230) of any of paragraphs D0 through D3, wherein the curable protective film (154, 254) comprises polyurethane prepolymers.

D7. The vacuum assembly (130, 230) of paragraph D6, wherein the curable film (154, 254) further comprises strengthening agents.

D8. The vacuum assembly (130, 230) of any of paragraphs D0 through D7, wherein the fibrous preform (152, 252) comprises dry fibers.

D9. The vacuum assembly (130, 230) of any of paragraphs D0 through D8, wherein the curable film (154, 254) comprises a prepolymer layer (160), a reinforcement layer (156), and an adhesive layer (158).

D10. The vacuum assembly (130, 230) of paragraph D9, wherein the reinforcement layer (156) comprises a thermoplastic film.

D11. The vacuum assembly (130, 230) of paragraph D9, wherein the reinforcement layer (156) comprises a woven fabric.

E0. The use of a resin infusion system (100, 200) in accordance with the present teachings to infuse a fibrous preform with a resin matrix, adhering a curable surfacing film to the fibrous preform.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

Advantages, Features, and Benefits

The different embodiments and examples of the methods for manufacturing resin-infused parts having integral protective coatings described herein provide several advantages over known solutions for applying protective coatings to resin-infused parts. For example, illustrative embodiments and examples described herein do not require a paint booth to apply a protective coating, saving space within manufacturing facilities. Integral protective coatings described herein are applied without spraying, reducing emissions of volatile organic chemicals (VOCs).

Additionally, and among other benefits, illustrative embodiments and examples described herein protect resin-infused parts from environmental damage. Often resin-infused parts are stored for days to weeks between manufacture and painting. Accordingly, any portions of the part which experience environmental damage during storage must be sanded and primed before applying a topcoat. Applying curable protective coatings during manufacture protects the resin-infused parts during storage. Additionally, in some examples, curable protective coatings described herein function as primers, and may be directly painted over without sanding or priming.

Additionally, and among other benefits, illustrative embodiments and examples described herein save manufacturing time, as the resin-infused parts are manufactured, coated, and cured in a single manufacturing apparatus, reducing the use of consumables.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A method of manufacturing a resin-infused part, the method comprising:
preparing a laminate by layering a curable protective film comprising a prepolymer layer and a resin blocking layer onto a fibrous preform, such that the resin blocking layer is disposed between the prepolymer layer and the fibrous preform;
infusing resin into the laminate under a vacuum, such that the resin impregnates the fibrous preform and the curable protective film adheres to the fibrous preform; and
curing the laminate at a curing temperature.

2. The method of claim 1, further comprising sealing the laminate within a vacuum bag.

3. The method of claim 1, wherein preparing the laminate further comprises:

disposing a porous release film beneath the fibrous preform; and
covering the curable protective film with a released caul plate.

4. The method of claim 1, wherein the curable protective film further comprises a reinforcement layer.

5. The method of claim 4, wherein the prepolymer layer comprises epoxide resins.

6. The method of claim 5, wherein the prepolymer layer further comprises an ultraviolet-visible light (UV-vis)-blocking additive.

7. The method of claim 5, wherein curing the laminate causes the epoxide resins to polymerize to form a thermosetting polymer coating layer.

8. The method of claim 4, wherein the prepolymer layer comprises at least one isocyanate and at least one polyol.

9. The method of claim 8, wherein curing the laminate causes the prepolymer layer to polymerize, such that a polyurethane thermosetting coating layer is formed.

10. A method of manufacturing a resin-infused part, the method comprising:
applying a first curable film comprising a prepolymer layer and a resin blocking layer to a caul plate;
installing the caul plate over a fibrous preform, such that the resin blocking layer is disposed between the prepolymer layer and the fibrous preform;
infusing resin into the fibrous preform under vacuum, such that the fibrous preform is impregnated by the resin and the first curable film adheres to the fibrous preform; and
curing the fibrous preform and the first curable film.

11. The method of claim 10, wherein the first curable film comprises epoxide resins, and wherein curing the fibrous preform and the first curable film forms an epoxy surfacing layer.

12. The method of claim 10, wherein the first curable film comprises polyurethane prepolymers, and wherein curing the fibrous preform and the first curable film forms a polyurethane paint replacement layer.

13. The method of claim 10, wherein the first curable film further comprises a tack layer.

14. The method of claim 10, further comprising applying a second curable film to the first curable film.

15. The method of claim 14, wherein the first curable film comprises polyurethane prepolymers and wherein the second curable film comprises epoxide resins.

16. A method of manufacturing a resin-infused part, the method comprising:
applying a first curable film comprising a prepolymer layer and a resin blocking layer to a fibrous preform, such that the resin blocking layer is disposed proximate the fibrous preform;
installing a caul plate over the first curable film;
infusing resin into the fibrous preform under vacuum, such that the resin permeates the fibrous preform and the first curable film adheres to fibrous preform; and
curing the fibrous preform and the first curable film.

17. The method of claim 16, further comprising sealing the caul plate and the fibrous preform within an airtight tool.

18. The method of claim 16, wherein the caul plate further comprises a release layer.

19. The method of claim 16, wherein the first curable film comprises epoxide resins, and wherein curing the fibrous preform and the first curable film forms an epoxy surfacing layer.

20. The method of claim 16, wherein the first curable film comprises polyurethane prepolymers, and wherein curing the fibrous preform and the first curable film forms a polyurethane paint replacement layer.

\* \* \* \* \*